E. L. B. ZIMMER.
COMBINATION ELBOW COUPLING, VALVE, AND HANDLE FOR SUCTION CLEANERS.
APPLICATION FILED JUNE 2, 1915.
1,196,414. Patented Aug. 29, 1916.
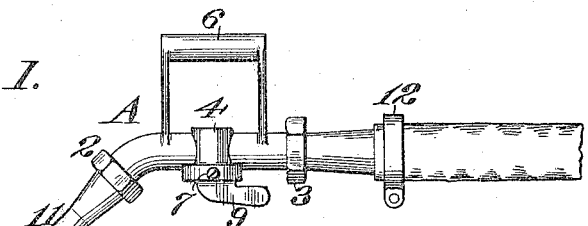
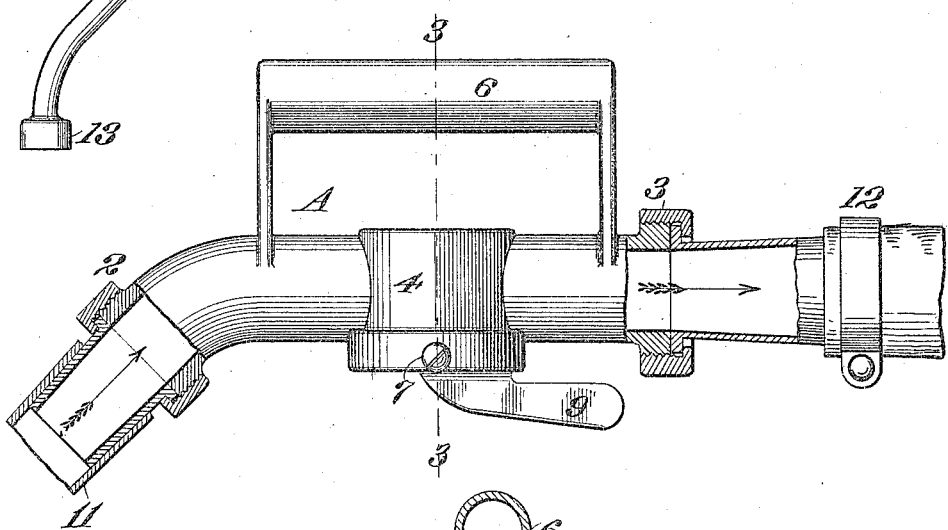
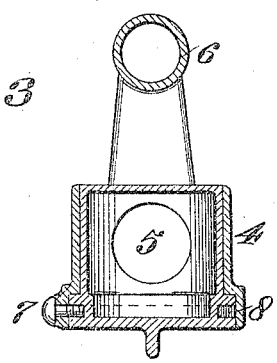
WITNESSES:
Charles Rickles
Thos Castberg
INVENTOR
Ernest L. B. Zimmer,
BY C. H. Strong,
ATTORNEY

UNITED STATES PATENT OFFICE.

ERNEST L. B. ZIMMER, OF OAKLAND, CALIFORNIA, ASSIGNOR, BY MESNE ASSIGNMENTS, TO BAKER-HAUSEN MANUFACTURING CO., OF OAKLAND, CALIFORNIA, A CORPORATION OF CALIFORNIA.

COMBINATION ELBOW-COUPLING, VALVE, AND HANDLE FOR SUCTION-CLEANERS.

1,196,414.  Specification of Letters Patent.  Patented Aug. 29, 1916.

Application filed June 2, 1915. Serial No. 31,755.

*To all whom it may concern:*

Be it known that I, ERNEST L. B. ZIMMER, a citizen of the United States, residing at Oakland, in the county of Alameda and State of California, have invented new and useful Improvements in Combination Elbow-Couplings, Valves, and Handles for Suction-Cleaners, of which the following is a specification.

This invention relates to a combination elbow coupling, valve and handle for suction cleaners.

It is one of the objects of the present invention to provide a combination handle and elbow for suction cleaners having a valve mounted therein and swivel couplings, one at each end, to which the hose and suction tools may be attached, thus combining in one element all the parts necessary for handling the hose and cleaning implements.

Further objects will hereinafter appear.

The invention consists of the parts and the construction and combination of parts as hereinafter more fully described and claimed, having reference to the accompanying drawings, in which—

Figure 1 is a side elevation showing the application of the invention. Fig. 2 is an enlarged side elevation of the device partly in section. Fig. 3 is a cross section on line 3—3, Fig. 2.

Referring to the drawings, A indicates the elbow proper, the ends of which are threaded to receive swivel couplings, such as indicated at 2 and 3. Formed centrally of the elbow is a chamber 4 in which is turnably mounted a cut-off valve 5, and preferably formed integral with the elbow is a handle 6. The valve proper is held in position by one or more screws, such as indicated at 7. These screws enter an annular groove 8 formed in the head end of the valve, thus preventing the valve from dropping out and at the same time permitting the valve to be turned freely by means of a handle 9.

The swivel couplings employed permit the hose and suction cleaning implements to turn or twist in any direction with relation to the elbow and handle, thus permitting operation with the expenditure of little effort and by the simple manipulation of the controlling valve. The outer section of coupling 2 is preferably tapered inwardly to permit tube 11 to be forced on exteriorly of same, thus making a quickly detachable, simple connection at this point. Coupling 3 is reversed in shape, that is, it is slightly tapered to increase in diameter at its outer end to receive the hose and clamping ring, such as indicated at 12; the gradual increase in diameter preventing the hose from slipping or pulling off if once secured. The swivel couplings do not only prevent the hose from twisting and kinking but also permit tube 11, with connected cleaning shoe 13, or other implement, to be turned in any desired position. For instance, it may easily be turned so that it may be shoved under a radiator or like narrow space or run over the top of a picture molding and the like.

From the foregoing description it will be seen that all the connections necessary for the handling of the hose and cleaning implements have been combined in a single unit. This not only prevents the different parts from becoming lost, but also permits greater flexibility, application and easy handling.

The handle forms a convenient grip by which the hose and cleaning implements are held and also serves to reinforce and strengthen the elbow. The use of the handle at this particular point is important because heretofore with these instruments, particularly where there is a valve at the angle, it has been very difficult for the operator to grip the instrument; the tool usually being held so that the angle comes to an elevation somewhat below the waist-line of the operator. It is necessary, in pushing the tool over the surface to be cleaned, to grip it and hold it so that the face or mouth of the tool 13 is always substantially parallel with the surface. Also owing to the size of the angle it is further difficult to get a grip on it without the handle here provided, particularly without interfering with the valve.

The materials and finish of the several parts of the device are such as the experience and judgment of the manufacturer may dictate.

Having thus described my invention, what I claim and desire to secure by Letters Patent is—

1. An elbow for suction cleaners composed of a member having each of its ends threaded and formed with a valve casing at a point between its ends, a turnable valve in the casing, a handle for the valve underlying the casing and member, a handle for the member overlying the casing and member, and swivel couplings engaged with the respective threaded ends of the member.

2. An elbow for suction cleaners composed of a hollow member, a pair of swivel couplings connected to the respective ends of the member, a valve in the member located between said swivel couplings, means for operating the valve, and a handle connected to the member and straddling the valve, and arranged between the ends of the member.

3. An elbow for suction cleaners including a member having a pair of swivel couplings connected to its respective ends, a valve in the member, a handle connected to the member, and a handle for the valve disposed between the ends of the first named handle, said handles being located in approximate alinement in a plane transverse of the member to allow both to be gripped by the two hands of the operator without appreciable separating movement of the hands.

In testimony whereof I have hereunto set my hand in the presence of two subscribing witnesses.

ERNEST L. B. ZIMMER.

Witnesses:
E. S. PAGE,
A. E. CUNAN.

Copies of this patent may be obtained for five cents each, by addressing the "Commissioner of Patents, Washington, D. C."